United States Patent

Kurz et al.

Patent Number: 6,106,926
Date of Patent: *Aug. 22, 2000

[54] THERMOPLASTIC RAW MATERIAL AND FILM PRODUCED THEREFROM

[75] Inventors: Rainer Kurz, Taunusstein; Franz Hora, Kriftel, both of Germany

[73] Assignee: Mitsubishi Polyester Film GmbH, Wiesbaden, Germany

[*] Notice: This patent issued on a continued prosecution application filed under 37 CFR 1.53(d), and is subject to the twenty year patent term provisions of 35 U.S.C. 154(a)(2).

[21] Appl. No.: 08/735,998

[22] Filed: Oct. 23, 1996

[30] Foreign Application Priority Data

Oct. 25, 1995 [DE] Germany ............... 195 39 651
Feb. 13, 1996 [DE] Germany ............... 196 04 828

[51] Int. Cl.[7] ............... B32B 15/04; B32B 15/08; B32B 27/20; B32B 27/36
[52] U.S. Cl. ............... 428/141; 428/323; 428/328; 428/329; 428/330; 428/331; 428/338; 428/458; 428/480; 428/694 SG; 428/910; 428/327
[58] Field of Search ............... 428/323, 325, 428/327, 328, 329, 330, 331, 480, 694 SG, 694 SL, 141, 910, 458, 339, 338

[56] References Cited

U.S. PATENT DOCUMENTS

| | | | |
|---|---|---|---|
| 3,884,870 | 5/1975 | Dodson et al. | 260/40 R |
| 3,980,611 | 9/1976 | Anderson et al. | 260/40 R |
| 4,092,289 | 5/1978 | Remmington | 260/40 R |
| 4,138,386 | 2/1979 | Motegi et al. | 260/40 R |
| 4,818,581 | 4/1989 | Katoh et al. | 428/143 |
| 5,096,773 | 3/1992 | Sakamoto | 428/323 |
| 5,153,302 | 10/1992 | Masuda et al. | 528/272 |
| 5,164,439 | 11/1992 | Sakamoto et al. | 524/425 |
| 5,284,699 | 2/1994 | Nishino et al. | 428/217 |
| 5,401,558 | 3/1995 | Sakamoto et al. | 428/141 |
| 5,478,632 | 12/1995 | Kurz et al. | 428/212 |
| 5,532,047 | 7/1996 | Okazaki et al. | 428/213 |

FOREIGN PATENT DOCUMENTS

| | | |
|---|---|---|
| 0 310 677 | 4/1989 | European Pat. Off. |
| 0 378 154 | 7/1990 | European Pat. Off. |
| 0 423 402 | 4/1991 | European Pat. Off. |
| 0 622 173 | 11/1994 | European Pat. Off. |
| 1068713 | 8/1962 | United Kingdom |
| 2 143 772 | 2/1985 | United Kingdom |
| 88/07928 | 10/1988 | WIPO |
| 94/13464 | 6/1994 | WIPO |
| 94/13482 | 6/1994 | WIPO |

*Primary Examiner*—Vivian Chen
*Attorney, Agent, or Firm*—Foley & Lardner

[57] ABSTRACT

A thermoplastic raw material, such as a polyester, containing particles (I) having an average particle diameter of <0.5 $\mu$m and particles (II) having an average particle diameter of from 3.3 to 4.0 $\mu$m, is useful, for example, in the production of an oriented monolayer or multilayer film having a total thickness of $\leq 4$ $\mu$m and a roughness on at least one film surface of $R_a$ <30 nm, the surface gas flow time t on at least one film surface being <2900 sec and the winding stability of the film being at least 8000. The film is useful, for example, as a capacitor film.

23 Claims, 1 Drawing Sheet

THERMOPLASTIC RAW MATERIAL AND FILM PRODUCED THEREFROM

BACKGROUND OF THE INVENTION

1. Field of the Invention

The present invention relates to a thermoplastic raw material, such as a polyethylene terephthalate (PET) raw material, which contains finely divided, distributed, inorganic and/or organic particles, and films that have improved winding properties and are therefore more suitable than conventional films as capacitor films.

2. Description of Related Art

Particularly for use in capacitors, films used as dielectric materials have to be increasingly thin and smooth in order to reduce the size of the capacitors or to increase the capacitance yield. In addition to a reduction in size, which can be achieved, for example, by reducing the film thickness, it is of interest to increase the capacitance yield further. This is possible in principle by means of smoother films. However, the processing of increasingly thin, conventionally oriented films increasingly leads to the occurrence of irreversible film defects, such as the formation of creases and stretched areas, in the various processing steps, such as winding, metallization, cutting and capacitor winding.

To enable a film to be processed without creases and stretched areas, it requires on the one hand sufficient slip which prevents blocking of the film during the individual process steps. On the other hand, in addition to good slip, the film should have surface topography which permits the air between the individual film layers of the winding to escape sufficiently rapidly. Proposed technical solutions, such as increasing winding tensions, are only of limited use in the case of ultrathin films since an increase in the winding tension may lead to irreversible film defects, such as stretched areas.

In addition to good film handling, the electrical properties, in particular the dielectric strength and the defect behavior, constitute a further criterion for capacitor films. It is known that, when high particle concentrations or large average particle diameters are used, the number of voids increases due to the poor affinity of the inorganic particles for thermoplastic polymers in the molten state and on orientation with the usual orientation ratios. The presence of such voids has an extreme effect on the mechanical properties, such as tensile strength and elongation at break, and on the dielectric strength of the film. In addition, tears occur to an increasing extent during film production, having an adverse effect on productivity and stability of the film production process.

From these points of view, the haze of films with comparable surface roughnesses is a further criterion. The haze of the films is caused on the one hand by the surface haze, due to the surface roughness, and the internal haze, essentially due to (a) the number of particles, (b) the size of the particles, and (c) the size of the voids present around the particles. Accordingly, with comparable surface roughnesses, films having less haze are advantageous.

It is known (see U.S. Pat. No. 3,980,611) that the film handling can be improved by combining small, medium-sized and large particles, depending on the film thickness. In the patent, this is achieved by a combination of large (2.5–10.0 $\mu$m) with medium-sized (1.0–2.5 $\mu$m) and small (<1.0 $\mu$m) particles, it being necessary to fulfill certain relations of film thickness to particle concentration. The disadvantage of these ultrathin films is the relatively greater roughness or the high surface protuberances which are caused by the medium-sized and large particles which result in a lower capacitance yield per unit volume in the capacitor.

It is furthermore known (see EP-A-0 423 402) that films in the thickness range between 0.1 and 4 $\mu$m can be produced by adding inert, organic particles obtained by secondary agglomeration and having a particle diameter of from 0.05 to 5 $\mu$m and a primary, spherical particle having a particle diameter from 0.05 to 4 $\mu$m.

EP-A-0 622 173 states that handling of an oriented monolayer or multilayer film having a total thickness of $\leq 4$ $\mu$m and a roughness of <30 nm can be ensured if the surface gas flow resistance on at least one film surface is t $<a \cdot d^b$ [sec] (where a=0–10,000 [sec/$\mu$m], b=−3 to 0 and d=total film thickness $\leq 4$ $\mu$m). This can be achieved, according to EP-A-0 622 173, by the combination of a spherical particle (I) with a second particle (II) which has an average particle diameter of 0.05–2.5 $\mu$m, the average particle diameter of the particles (II) being greater than that of the particles (I).

SUMMARY OF THE INVENTION

It was an object of the present invention to provide films that have the properties desired for use as capacitor films, such as small film thickness, sufficient film roughness, sufficient surface gas flow, reduced haze, and good film winding stability.

It is also an object of the present invention to provide a raw material that can be used to produce such a film.

It is also an object of the invention, to provide methods of making and using such films and raw materials.

A further object resides in the provision of improved capacitors made with the film according to the invention.

In accordance with these objectives there is provided according to one aspect of the present invention an oriented monolayer or multilayer film having a total thickness of $\leq 4$ $\mu$m and a winding stability of $\geq 8000$ and a roughness on at least one film surface of $R_a$ <30 nm and a surface gas flow time on at least one film surface of t <2900 sec.

In accordance with these objectives there is also provided according to the invention a film raw material comprising one or more thermoplastic polymers and particulate material, wherein the particulate material comprises particles (I) having an average particle diameter of <0.5 $\mu$m and particles (II) having an average particle diameter of from 3.0 to 4.0 $\mu$m.

In accordance with another aspect of the invention, there has been provided an improved capacitor in which one surface of the film according to the invention is metallized wound up or wrapped to give a capacitor.

Further objects, features, and advantages of the present invention will become apparent from the detailed description of preferred embodiments that follows.

DETAILED DESCRIPTION OF PREFERRED EMBODIMENTS

Figure 1:
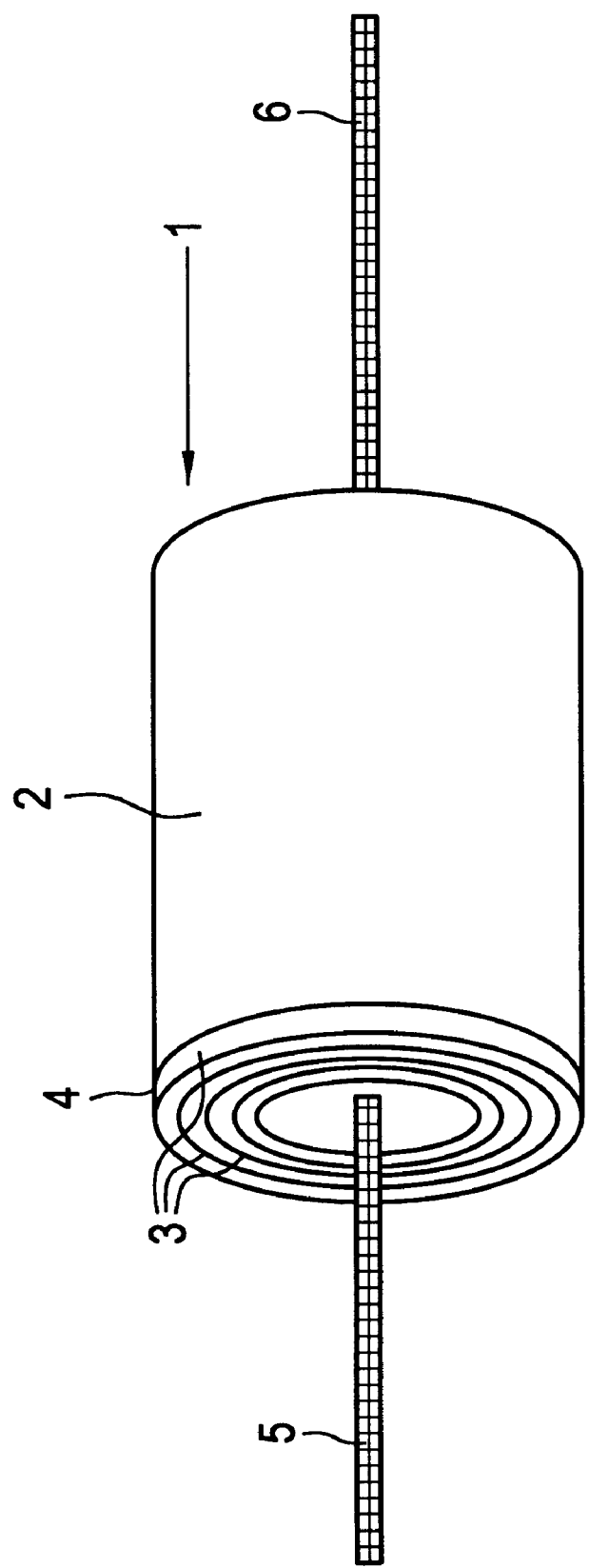
FIG. 1 is a picture of a wound capacitor.

One object of the present invention is to provide a film having a film thickness as small as possible and to very substantially prevent the occurrence of winding defects, such as irreversible stretched areas. The ultrathin film should have sufficient slip (good film handling) and film roughnesses $R_a$ from 10 nm to <30 nm, surface gas flow resistances t from 1900 sec to <2900 sec, and preferably a haze in the range from 1.0% to $\leq 4.0\%$.

In addition, the films should have improved winding stability when the metallized narrow sections are wound to give film capacitors. The winding stability is the number of windings wound on a core having an external diameter between 40 and 80 cm. This number of windings or the number of wound layers should be ≧8000 for a 2 μm thick, 4.5 mm wide film wound with a winding tension of <10 N/mm².

As shown in the single Figure, the invention provides a wound capacitor 1 produced from the ultrathin film 2 according to this invention. One side of the film 2 is metallized, whereas the other side is not metallized. On the metallized side of the film, a non-metallized edge zone 4 is provided, which extends along the longitudinal edge 3 of the film, from said film edge to the beginning of the metallized area. Connecting leads 5 and 6 project from the end faces of the wound capacitor 1.

The present invention provides an ultrathin film having a thickness of 0.5 μm to ≦4 μm. The film may be produced from a raw material which contains a combination of particles (I) and (II), the particles (I) having an average particle diameter of <0.5 μm and the particles (II) an average particle diameter of from 3.0 to 4.0 μm. Such films can be produced without the film handling problems mentioned. Moreover, these films have excellent winding stabilities.

The present invention provides an oriented monolayer or multilayer film comprising a thermoplastic material and having a total thickness of ≦4 μm, a roughness on at least one film surface of $R_a$ <30 nm, preferably <29 nm, a surface gas flow resistance of t <2900 sec, preferably <2500 sec, in particular <2300 sec, and a winding stability of generally >8000, preferably >8200, in particular >8300 up to <24000. The film thickness can be as small as possible, e.g, down to 0.5 μm. Surface roughness and surface gas flow resistance are measured on the same film surface.

The invention furthermore provides a film raw material based on a thermoplastic material which contains inorganic and/or organic particles (I) having an average particle diameter of <0.5 μm and inorganic and/or organic particles (II) having an average particle diameter of from 3.0 to 4.0 μm. These average particle diameter figures mean that 50% of the particles within the respective particle diameter range have a diameter exceeding the average particle diameter value indicated.

The ultrathin films according to the invention, generally having roughnesses $R_a$ of less than 30 nm and a surface gas flow resistance t <2900 sec and a winding stability of at least 8000, which can be processed without creases and stretched areas, can be produced from the above film raw material which, in addition to the thermoplastic polymer, essentially contains inorganic and/or organic particles (I) having an average particle diameter of <0.5 μm and inorganic and/or organic particles (II) having an average particle diameter of from 3.0 to 4.0 μm. Surprisingly, it has been found that the films according to the invention have a haze of ≦4.0%, preferably ≦3.9%, in particular ≦3.8%.

The organic and/or inorganic particles (I) may be spherical and/or nonspherical and have an average particle diameter of <0.5 μm, preferably from 0.01 to 0.4 μm, in particular from equal to 0.3 to equal to 0.4 μm. The width of the particle size distribution of the particles (I) is not critical; thus, both monodisperse particles and particles having a distribution may be used. The particles (I) may be primary particles, i.e., individual, nonagglomerated particles, but also particles obtained by secondary agglomeration, i.e., particles coalesced to give larger units. The primary particles in particular have diameters in the range from 0.04 to 0.05 μm. Particles (I) obtained by secondary agglomeration are preferably used. In the case of the agglomerated particles, the average particle diameter is based on the mean diameter of the agglomerates. Agglomeration is achieved by mixing of the polymer with additives and simultaneous heating to a temperature above the fusing temperature of the mixture.

The organic and/or inorganic particles (II) may be spherical and/or nonspherical and have an average particle diameter of from equal to 3.0 to equal to 4.0 μm, preferably from 3.3 to 3.7 μm, in particular about 3.5 μm. The width of the particle size distribution of the particles (II) is not critical; thus, both monodisperse particles and particles having distribution may be used.

Any type of inorganic or organic particles may be used as particles (I) and (II). For example, the particles (I) and (II) may be both inorganic particles—for example, of kaolin, alumina, silica, amorphous silica, pyrogenic silica, natural and precipitated calcium carbonate; and/or organic particles—for example, comprising silicones, acrylates or epoxy resin compounds. Particles (I) and (II) may be the same or different. Such particles are commercially available.

"Spherical" means that the particles have an aspect ratio of from 1 to 1.2. "Aspect ratio" is the quotient of the largest and the smallest particle diameter. This is ideally equal to 1. The aspect ratios are measured on particles in a prepared film and accordingly do not relate to the aspect ratios of the free particles. "Monodisperse" means that the particles have a very narrow particle size distribution; ideally, they have no distribution at all. In this case, there is no longer any average particle size since all particles have, for all practical purposes, the same diameter. The particle diameter of the particles and/or agglomerates as well as the aspect ratio and the monodispersity can be determined by measurement of electron micrographs at a resolution of from 3000 to 10,000. The particles (I) and (II), having an average particle diameter of 0.3 to 0.4 μm, and of 1.0 to 3.5 μm, respectively, are incorporated into the polyester in amounts of from equal to 4000 to equal to 5500 ppm and from 480 to 3000 ppm, respectively. The larger the average particle diameter of the particles (II) is, the smaller is their amount, in ppm, contained in the polyester.

The particles are used in an amount necessary to impart the desired properties to films. According to the invention, the raw material generally contains from 0.005 to 5.0% by weight of particles of the types (I) and (II) (this range corresponds to the sum of the particles I and II and is based on the cumulative weight of polymer and particles). From 0.4 to 1.0% by weight of particles (I) and from 0.04 to 0.1% by weight of particles (II) are preferably used.

Any type of thermoplastic polymer(s) can be used in the raw material and films. Thermoplastic materials useful in the present invention include polyester raw materials which contain predominantly, i.e., in an amount of at least 80% by weight, preferably at least 90% by weight, a polymer selected from the group of polyethylene terephthalate (PET), polyethylene naphthalate (PEN), poly-1,4-dicyclohexanedimethylene terephthalate (PCT), polyethylene naphthalate bibenzoate (PENBB), and blends of these polymers. Polyester raw materials which are composed essentially of ethylene terephthalate units and/or contain up to 30 mol % of comonomer units are preferred, a variation of the glycol and/or the acid component of the comonomer units being possible. The polyesters can be prepared either by the transesterification process using conventional catalysts, such as, for example, Zn, Ca, Li and Mn salts, or by the direct esterification process.

The film according to the invention is produced from a mixture of a thermoplastic polymer, such as polyester, with the particles (I), preferably obtained by secondary agglomeration, and the particles (II).

The polyester raw material can be prepared by adding the particles before the beginning of the transesterification or after the end of the transesterification. The addition of the particles in the form of a glycolic suspension before the end of the transesterification is preferred. Alternatively, the particles can also be incorporated after the raw material preparation, by blending, compounding, and the like.

The films, in particular polyester films, can be produced by known processes, which need not be described in more detail, from raw materials described above or a combination of the above raw materials with other raw materials or combined conventional additives in conventional amounts of generally from 0.1 to not more than 10% by weight. The films may be monofilms or multilayer. The films may be coextruded films having the same or differently formed surfaces, one surface, for example, containing a filler or being pigmented and the other surface containing no filler or pigment.

Particularly in the case of a multistage orientation process with high degrees of orientation in a preferred direction or in both directions of the film, for example, in the production of films having very good mechanical properties, the advantages of the particles incorporated according to the invention are particularly evident. Here, orientation processes with the sequence longitudinal-transverse-longitudinal, simultaneous orientation (longitudinal-transverse) and multiple orientation in one or both directions are also possible.

Orientation in the longitunal direction is performed by a factor of, e.g., 2.5 to 4.4, and orientation in the transverse direction is performed by a factor of, e.g., 3.0 to 4.5.

The invention is illustrated by the following non-limiting examples.

In the examples which follow, the particles (I) and (II) were added after the end of the transesterification, and the polycondensation was then carried out in the manner usual for PET, so that the polymer had a specific viscosity SV of 810. The following methods of measurements were used for characterizing the films obtained:

Surface Gas Flow Time

The principle of the method of measurement is based on the air flow between one side of the film and a smooth silicon wafer. The air flows from the environment into an evacuated space, the interface between film and silicon wafer offering resistance to the flow.

A circular film sample is placed on a silicon wafer, in the center of which a hole provides the connection to the container. The container is evacuated to a pressure of less than 0.1 mbar. The time [sec] which the air requires to produce a pressure increase of 56 mbar in the container is determined.

| Measuring conditions: | |
| --- | --- |
| Measured area: | 45.1 (cm$^2$) |
| Contact-pressure weight | 1276 (g) |
| Air temperature | 23 (° C.) |
| Atomospheric humidity | 50 (%) rel. humidity |
| Air pressure | 1 (bar) |
| Collected gas volume | 1.2 (cm$^3$) |
| Gas interval | 56 (mbar) |

Roughness Measurement

The roughness characteristics were determined using a Perthometer S8P from Feinprüf-Perthen GmbH. The film sample was applied to a glass sheet, and a predetermined distance was covered by a mechanical tracer RFHTB 50.

| Measuring conditions: | |
| --- | --- |
| Diameter of the tracer tip | 5 (µm) |
| Traced length | 1.75 (mm) |
| Cut-off | 0.25 (mm) |
| Measuring range | 12.5 (µm) |
| Tracing step | 50 |

Roughness Characteristics:

Ra center line average value (DIN 4768)

Rz average peak-to-valley height (DIN 4768/1)

Rt peak-to-valley height (DIN 4762–1960)

Haze Measurement

The test serves for determining the haze and transparency of plastic films in which the optical clarity or haze is important for the utility value. The measurement is carried out using a Hazegard Hazemeter XL-211 from BYK Gardner according to ASTM D 1003-61.

Determination of the Average Particle Diameter

The average particle diameter of primary particles as well as of agglomerated particles is determined with the aid of a Horiba LA500 particle size analyzer from Horiba. The determination of the average particle sizes, also referred to as the d50 value, is carried out in glycolic suspensions of the particles to be investigated. The d50 value is the value at which 50% of the particles within the respective particle size distribution have a particle diameter exceeding the stated average particle diameter value in µm.

Film Handling

The film handling is evaluated on the basis of the occurrence of creases during winding or cutting of a biaxially oriented film.

−=Creasing

+=No creasing

EXAMPLE A (Less Preferred Example)

4000 ppm of small SiO$_2$ particles obtained by secondary agglomeration (manufacturer: Degussa, Hanau) and having an average particle diameter of from 0.3 to 0.4 µm and 3000 ppm of medium-sized particles (CaCO$_3$) (manufacturer: Omya, Cologne) having an average particle diameter of 1.1 µm were incorporated into polyethylene terephthalate (PET).

EXAMPLE B (Comparative Example, corresponds to EP-A 0622 173)

3000 ppm of small, spherical, monodisperse SiO$_2$ particles (manufacturer: Merck, Darmstadt) having a particle diameter of 0.4 µm and 3000 ppm of medium-sized particles (CaCO$_3$) having an average particle diameter of 0.99 µm were incorporated into PET.

EXAMPLE C (Comparative Example)

5000 ppm of small SiO$_2$ particles obtained by secondary agglomeration and having an average particle diameter of from 0.3 to 0.4 µm and 1000 ppm of SiO$_2$ particles having an average particle diameter of 2.5 µm were incorporated into PET.

EXAMPLE D 5500 ppm of small $SiO_2$ particles obtained by secondary agglomeration and having an average particle diameter of from 0.3 to 0.4 μm and 480 ppm of large particles ($Sio_2$) having an average particle diameter of 3.5 μm were incorporated into PET.

In each example, the PET chips obtained were dried at 160° C. to a residual moisture content of 50 ppm and extruded at from 280 to 310° C. The molten polymer was taken off from a die (die gap 1 mm) via a take-off roll. The unoriented film was oriented by a factor of 3.8 in the machine direction at from 85 to 135° C. Transverse orientation by a factor of from 3.6 to 4.5 was carried out in a frame. The film was then fixed in a further frame at from 180 to 230° C.

The properties of films produced in this manner are shown in Tables 1 and 2 below.

TABLE 1

| Film type | Roughness $R_a$ (nm) | Film thickness (μm) | Surface gas flow time (sec) | Haze (%) | Film handling |
|---|---|---|---|---|---|
| Example A | 26 ± 2 | 2 | 1200 ± 200 | 3.9 ± 0.5 | − |
| Example B | 28 ± 5 | 2 | 716 ± 150 | 4.7 ± 0.5 | + |
| Example C | 36 ± 8 | 2 | 1250 ± 100 | 4.5 ± 0.5 | + |
| Example D | 28 ± 6 | 2 | 2200 ± 300 | 3.7 ± 0.5 | + |

TABLE 2

| Film type | Film thickness (μm) | Surface gas flow time (sec) | Roughness $R_a$ (nm) | Winding stability |
|---|---|---|---|---|
| Example C | 2 | 1250 ± 100 | 36 ± 8 | 7878 |
| Example D | 2 | 2200 ± 300 | 28 ± 6 | 8454 |

The film according to Example D shows substantially lower haze values than the films from the Comparative Examples. Since the surface roughnesses ($R_a$ values) of the film according to the invention from Example D are comparable with those of the film from Comparative Example B, this indicates, in the case of Example D, a smaller amount of voids and accordingly improved electrical film properties and advantages in film production (fewer tears).

In addition to the advantages with regard to the surface roughness, windability and low levels of haze, the films according to the invention (Example D) have further advantages with regard to the winding stability in comparison with commercial film types (Example C=Hostaphan® RE, Hoechst Diafoil). With films from Example D, it is possible to achieve about 10% more windings without the corresponding winding edges tilting or becoming unstable (cf. Table 2). This is a further advantage of the films according to the invention, which is reflected in improved productivity in the production of film capacitors.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

What is claimed is:

1. An oriented monolayer or multilayer film having a total thickness of ≦4 μm and a winding stability of ≧8000 and a roughness on at least one film surface of $R_a$<30 nm and a surface gas flow time on at least one film surface of t<2900 sec, wherein the film contains particles (I) having an average particle diameter of <0.5 μm and particles (II) having an average particle diameter of from 3.3 to 4.0 μm.

2. An oriented film as claimed in claim 1, wherein the film has a haze of ≦4.0%.

3. An oriented film as claimed in claim 1, which is biaxially oriented.

4. An oriented film as claimed in claim 1, which is monolayer.

5. A capacitor comprising a film as claimed in claim 1 wound alternately with a conductive material.

6. An oriented film as claimed in claim 1, which is a polyester film.

7. An oriented film as claimed in claim 6, wherein the thermoplastic polymer is selected from polyesters selected from the group consisting of polyethylene terephthalate, polyethylene naphthalate, poly-1,4-dicyclohexanedimethylene terephthalate, polyethylene naphthalate bibenzoate, and blends of these polyesters.

8. An oriented film as claimed in claim 1, which comprises 0.4 to 1.0% by weight of particles (I) and 0.04 to 0.1% by weight of particles (II) based on the total weight of the film.

9. An oriented film as claimed in claim 1, wherein the film contains 4000 to 5500 ppm of particles (I) and 480 to 3000 pm of particles (II).

10. An oriented film as claimed in claim 1, wherein particles (I) have an average particle diameter of from 0.3 to 0.4 μm and particles (II) have an average particle diameter of from 3.3 to 3.7 μm.

11. An oriented film as claimed in claim 10, wherein the particles (I) and (II) comprise silica particles.

12. A capacitor comprising an oriented film as claimed in claim 1.

13. A capacitor as claimed in claim 12, wherein one side of the oriented film is metallized and the other side is not metallized.

14. An oriented film as claimed in claim 1, which has a roughness on at least one film surface $R_a$ of 10 nm to <30 nm, a surface gas flow time on at least one film surface of t from 1900 sec to <2900 sec, and a haze in the range from 1.0% to less than or equal to 4%.

15. An oriented film as claimed in claim 1, which has a roughness on at least one film surface $R_a$ of 10 nm to <29 nm, a surface gas flow time on at least one film surface of t<2500 sec, a winding stability of greater than 8300, and a haze of less than 3.8%.

16. An oriented film as claimed in claim 1, wherein the particles (I) have an average particle diameter of from 0.01 to 0.4 μm.

17. An oriented film as claimed in claim 1, wherein the particles (I) are obtained by secondary agglomeration.

18. An oriented film as claimed in claim 1, wherein the particles (I) and (II) are independently selected from one or more of the group consisting of silica particles, particles of amorphous silica, particles of pyrogenic silica, kaolin particles, alumina particles, calcium carbonate particles of natural or precipitated calcium carbonate, silicone particles, crosslinked polystyrene particles, crosslined epoxy resin particles, and crosslinked acrylate particles, wherein the particles (I) and (II) comprise the same or different materials.

19. An oriented film as claimed in claim 1, which has a roughness on at least one film surface $R_a$ of 10 nm to <29 nm, a surface gas flow time on at least one film surface of t<2500 sec, a winding stability of greater than 8200, and a haze of less than or equal to 3,9%.

20. A film raw material comprising one or more thermoplastic polymers and particulate material, wherein the particulate material comprises particles (I) having an average particle diameter of 0.3 to less than 0.5 μm and particles (II) having an average particle diameter of from 3.3 to 4.0 μm, said average particle diameter being a value at which 50% of the particles within a specific particle size distribution have a diameter exceeding the stated average particle diameter, wherein the thermoplastic polymer is selected from polyesters of the group consisting of polyethlene terephthalate, polyethylene naphthalate, poly-1,4-dicyclohexanedimethylene terephtalate, polyethlene naphthalate bibenzoate, and blends of these polyesters.

21. A film raw material as claimed in claim 20, wherein the particles (I) are obtained by secondary agglomeration.

22. A film raw material as claimed in claim 20, wherein the particles (I) and (II) are contained in the film raw material in a total amount of from 0.005 to 5% by weight based on the total weight of the polymer and particles.

23. A film raw material as claimed in claim 20, wherein the particles (I) and (II) are independently selected from one or more of the group consisting of silica particles, particles of amorphous silica, particles of pyrogenic silica, kaolin particles, alumina particles, calcium carbonate particles of natural or precipitated calcium carbonate, silicone particles, crosslinked polystyrene particles, crosslinked epoxy resin particles, and crosslinked acrylate particles, wherein the particles (I) and (II) comprise the same or different materials.

* * * * *